United States Patent [19]

Shatila et al.

[11] 4,060,367
[45] Nov. 29, 1977

[54] DRIVE MECHANISM FOR DOUGH SHAPING APPARATUS

[75] Inventors: Mounir A. Shatila, Blackfoot; John L. Veeneman, Idaho Falls; John H. Lach; James F. Harmon, both of Blackfoot, all of Idaho

[73] Assignee: Ampco Foods Inc., San Francisco, Calif.

[21] Appl. No.: 646,332

[22] Filed: Jan. 2, 1976

[51] Int. Cl.² ............................................. A21C 11/10
[52] U.S. Cl. .................................... 425/311; 425/308
[58] Field of Search ............... 425/289, 290, 292, 296, 425/142, 302 R, 308, 309, 310, 311, 192; 83/231, 399; 264/136, 137; 426/516, 518; 83/408, 425.3, 431

[56] References Cited

U.S. PATENT DOCUMENTS

| 785,489 | 3/1905 | Helflinger | 425/311 |
|---|---|---|---|
| 817,352 | 4/1906 | Walstead | 425/311 |
| 1,073,896 | 9/1913 | Furbeck | 83/207 |
| 3,344,752 | 10/1967 | Ilines | 425/308 |
| 3,470,830 | 10/1964 | Carter | 425/192 |
| 3,605,647 | 8/1971 | Beck et al. | 425/307 |
| 3,726,149 | 4/1973 | Ilines | 425/192 |
| 3,771,937 | 11/1973 | Harmon et al. | 425/306 |
| 3,890,453 | 6/1975 | Harmon et al. | 426/516 |

Primary Examiner—J. Howard Flint, Jr.
Assistant Examiner—W. R. Briggs
Attorney, Agent, or Firm—Thomas H. Olson

[57] ABSTRACT

A mechanism for controllably driving a plunger in a dough forming apparatus of the type that has a chamber in which the plunger resides to move dough in incremental steps toward one end of the chamber. Spanning the one end of the chamber is a plurality of parallely spaced apart elongate members, the spacing between the elongate members corresponding to the thickness of a french fry shaped piece, e.g. ¼ inch. The plunger is advanced by increments of a similar distance, the distance corresponding to the width of the french fry piece and when a plurality of dough bodies protrude through the spaces between the elongate members a single wire cutter is reciprocated across the exterior of the elongate members to sever the protruding bodies thus to form french fry shaped pieces. In order that the pieces possess a square or substantially square cross sectional shape, the mechanism of the invention assures accurate incremental advancement of the plunger as well as affording a quiescent period during which the wire cutter is reciprocated across a transverse plane exterior with the surface of the elongate members. An extremely simple and accurate drive mechanism for assuring constant incremental advancement. A mechanism which in addition to affording constant incremental advance of the plunger provides a quiescent period for transverse dough cutting and affords actuation of the dough cutter during such quiescent period in response to a single driving stroke applied to the mechanism.

8 Claims, 6 Drawing Figures

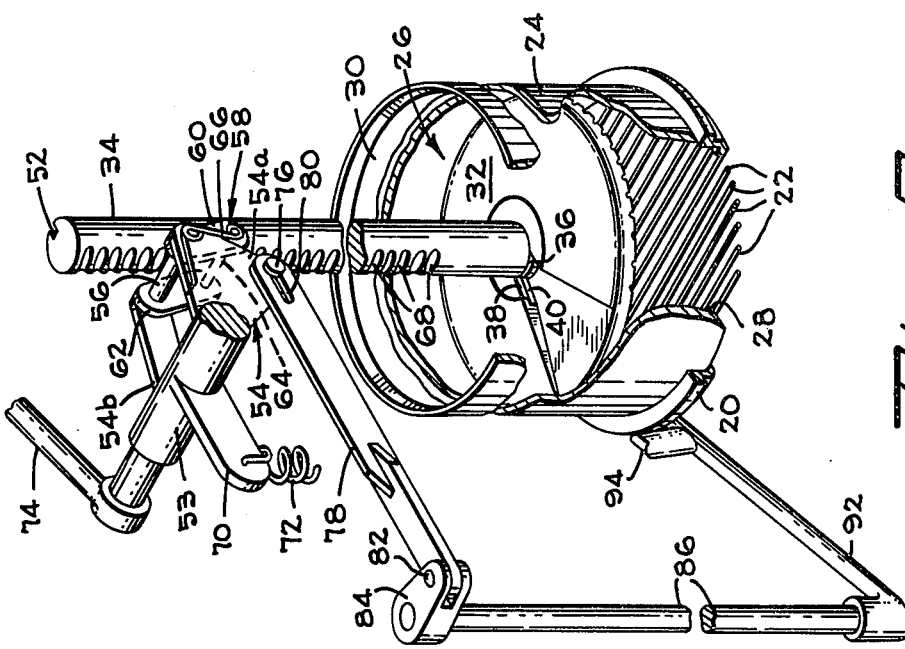
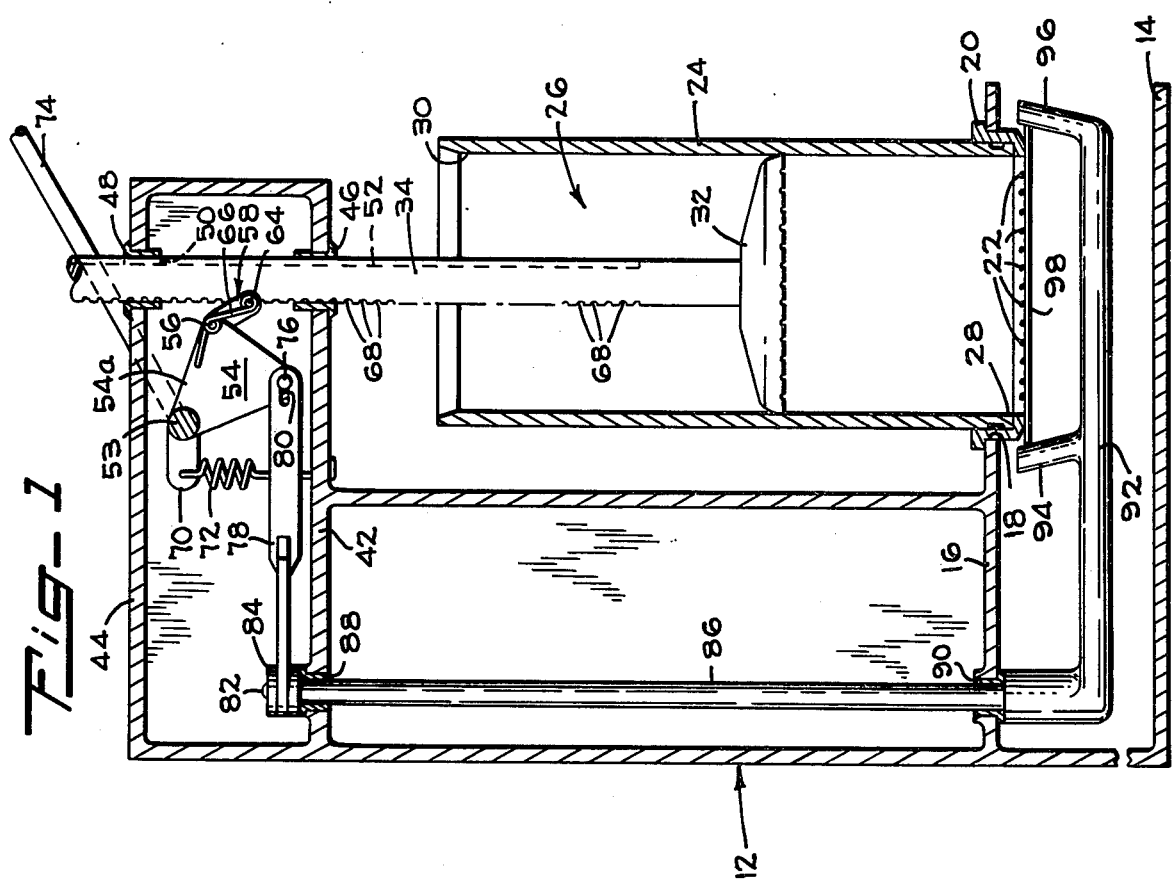

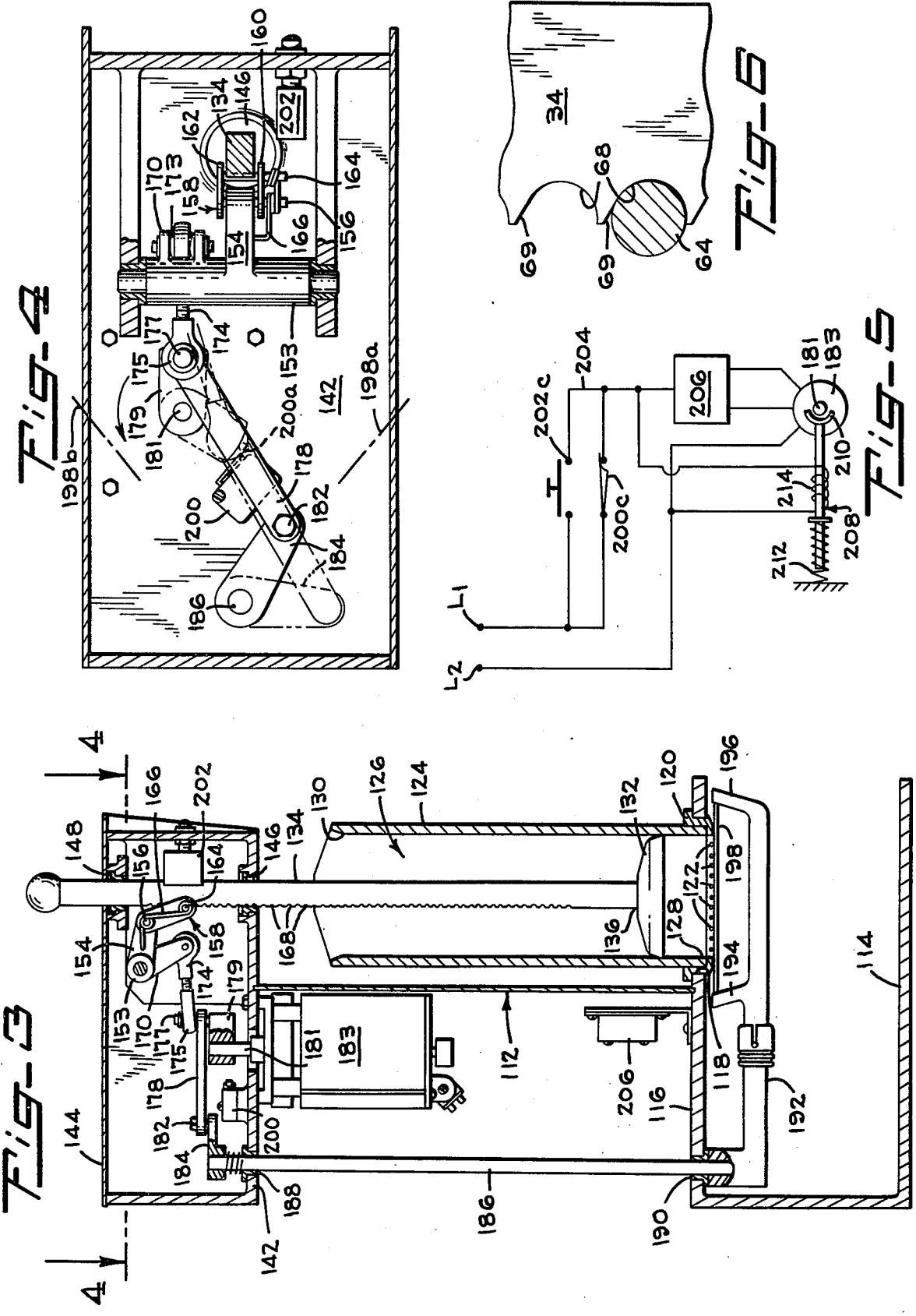

DRIVE MECHANISM FOR DOUGH SHAPING APPARATUS

BACKGROUND OF THE INVENTION

1. Field of the Invention

This invention relates to double acting mechanical drive mechanisms and more particulary to a drive mechanism for sequentially advancing a dough body by a pre-selected increment, terminating the advancing movement to produce a quiescent state and activating a transverse wire cutter during the quiescent state.

2. Description of the Prior Art

U.S. Pat. Nos. 3,605,647 and 3,771,937 disclose plunger advancing mechanisms employing a gear rack formed along the plunger shaft, a pinion enmeshed with the gear rack and a pinion drive mechanism including a Geneva drive for driving the plunger in incremental steps. The operation of the patented apparatus is most satisfactory but the cost of producing and maintaining the toothed parts in such apparatus, particularly in a restaurant environment where rough usage is typical, can be substantial.

U.S. Pat. No. 3,726,149 discloses an incremental advance mechanism which employs a hardened steel ring that is caused to bite into the surface of the plunger rod, a system that, because of relatively rapid wear, is difficult to maintain in proper adjustment over a long period of time.

SUMMARY OF THE INVENTION

The environment in which the present invention finds particular applicability is in a machine for forming french fry shaped potato pieces from potato dough. The art of production of the dough and formation of the same in the french fry pieces is well developed, as evidenced by commonly assigned U.S. Pat. Nos. 3,605,647 and 3,771,937. Those patents disclose chambers having open ends and a plunger or piston supported in the chamber for movement toward and away from one end of the chamber by means of a drive rod extending into the piston from the other end. Spanning one end of the chamber is a plurality of thin parallely spaced apart elongate members which are spaced from one another by a distance equal to the thickness dimension of a french fry piece, e.g. ¼ inch. The plunger is controlled to advance potato dough through the spaces between the elongate members by an equal amount, i.e. an amount corresponding to the width of the french fry piece. When the dough protrudes through the spaces between the elongate members by such amount, plunger advancement is interrupted and a single wire cutter is reciprocated, in windshield wiper-like motion, across the exterior surface of the elongate members so as to separate the protruding dough portions from the dough within the chamber, thereby to form french fry pieces that have a length corresponding to the diameter of the chamber, a thickness corresponding to the space between adjacent elongate members and a width corresponding to the amount by which the plunger advances the dough exterior of the plane of the elongate members.

The present invention provides an improved, extremely simple mechanism for advancing the plunger by a constant accurately determined increment, terminating advancement of the plunger to afford a quiescent period and then, during the quiescent period, actuating the single wire cutter to sever the protruding dough bodies from the dough within the chamber. As will appear the mechanism lends itself either to manual operation or to motorized operation.

An object of the invention is to provide a mechanism of the type referred to above that assures substantially uniform incremental advancement of the dough so as to assure uniformity in the width of the french fry shaped bodies produced. This object is achieved by providing a crank supported for pivotal movement about an axis that bears a fixed spatial relationship to the piston drive rod. Attached to the distal end of the crank for relative pivotal movement is a yoke, the free end of which supports a cylindrical cross pin. The piston rod has on its surface a series of uniformly spaced apart generally semi-cylindrical grooves having a diameter corresponding to that of the cross pin so that during engagement between the cross pin and one of the grooves a driving connection therebetween is established. The relative lengths of the crank and yoke are established so that after a prescribed angular rotation of the crank about its pivotal axis, a "dead center" position is reached at which the cross pin disengages from a groove in the piston drive rod. Such disengagement achieves the above mentioned quiescent period and further rotation of the crank will not advance the plunger. Drive mechanism to the transverse wire cutter is activated during such further rotation of the crank so that transverse dough cutting occurs during the quiescent period. Restoration of the crank to its initial position readies the apparatus for another cycle of operation.

A feature and advantage of the invention is that once constructed the mechanism performs accurately without adjustment or significant wear. This feature and advantage follows from the fact that all parts are optimally loaded during operation.

Another feature and advantage of the invention is that relatively inexpensive parts and relatively uncomplex machining operations suffice to construct the drive mechanism of the invention. For example, stamped parts can be employed throughout. Moreover, the arrangement of the mechanism permits formation of the grooves in the piston drive rod without undue attention to manufacturing tolerances.

A further feature and advantage of the invention is that the mechanism lends itself either to manual operation or to motorized operation. Achievement of this advantageous mode of operation follows from the fact that the crank and its associated yoke operate satisfactorily by rocking motion of a relatively limited angular extent, the specific angular extent being non-critical because the incremental advancement of the plunger rod occurs during only a portion of the angular actuation of the crank.

Another object of the invention is to provide a mechanism that affords incremental piston advancement without concurrent transverse cutter movement, and then affords transverse cutter movement without concurrent piston advancement. Achievement of this object permits production of french fry shaped bodies of square or rectangular cross-sectional configuration. This object is achieved in part by linking the transverse cutter drive mechanism to the piston advancement mechanism by means of a lost motion linkage.

The foregoing together with other objects, features and advantages will be more apparent after referring to the following specification and accompanying drawings.

BRIEF DESCRIPTION OF THE DRAWINGS

FIG. 1 is an elevation view in cross section of a manually operated machine embodying the present invention.

FIG. 2 is a fragmentary perspective view of the apparatus of FIG. 1.

FIG. 3 is an elevation view in cross section of a motor driven machine embodying the present invention.

FIG. 4 is a cross sectional plan view taken along line 4—4 of FIG. 3.

FIG. 5 is a schematic wiring diagram showing the control wire for the motorized embodiment of the invention.

FIG. 6 is a fragmentary view at enlarged scale of a detail of the invention.

DESCRIPTION OF THE PREFERRED EMBODIMENTS

Referring more particularly to the drawings, reference numeral 12 indicates a support frame having a horizontal base plate 14 adapted to rest on a counter top or the like. Spaced above base plate 14 by an amount sufficient to permit placement of a receiving container on the upper surface of the base plate is a lower horizontal support plate 16. Support plate 16 defines an opening 18 in which is supported a flanged rim 20 of a dough separating structure that includes a plurality of parallely spaced apart rigid elongate members 22. Elongate members 22 can be formed of metal, plastic or the like and can have any suitable cross-sectional shape so long as at least about 60% of the area spanned by the elongate members is open area. The spacing between elongate members 22 corresponds to the thickness dimension of a french fry potato piece and is typically about ¼ inch. Supported within flanged rim 20 is a chamber forming wall 24 which defines a chamber 26 of uniform cross section throughout its length. The chamber has a circular cross-sectional shape. Chamber 26 has a discharge opening 28 which opening is spanned by elongate member 22. The upper end of the chamber defines an opening 30.

Supported for sliding movement within chamber 26 is a piston or plunger 32, which when it moves downward, forces potato dough disposed between the lower surface of the piston and discharge opening 28 through the spaces between adjacent elongate members 22. For so operating piston 32 there is a drive rod 34 secured to the upper surface of the piston. The lower end of drive rod 34 is grooved at 36, the walls of the groove engaging a collar 38 on the upper surface of piston 32 so that the piston and rod move in unison. Collar 38 has a radially opened slot 40 so that the piston can be installed onto and removed from the lower end of rod 34. In axial alignment above chamber 26 the frame includes upper horizontal plates 42 and 44 which are respectively provided with guide bushings 46 and 48 so as to constrain rod 34 for vertical movement on a line coaxial with the central axis of chamber 26. Bushing 48 is provided with an integral key 50 which slides in a keyway 52 extending lengthwise of rod 34, the key and the keyway coacting to prevent rotation of rod 34.

Supported in spaced relation to rod 34 and intermediate horizontal plates 42 and 44 there is a pivot shaft 53. Pivot shaft 53 is supported by bushings (not shown) for pivotal or rotational movement about an axis that is spaced from and perpendicular to the axis of rod 34. Because rod 34 in the embodiments shown herein is oriented vertically, pivot shaft 53 is supported for pivotal movement on an axis that is oriented horizontally. Rigid with pivot shaft 53 is a crank 54 which in the embodiment of FIGS. 1 and 2 is constituted by a triangular shaped plate 54a and a bar 54b that has a radial extent equal to the upper portion of the triangular plate. Crank 54 has a distal end at which is supported in spanning relation between plate 54a and bar 54b a pivot pin 56. The distance between pivot pin 56 and pivot shaft 53, as seen most clearly in FIG. 1, is less than the distance from the pivot shaft to the surface of rod 34.

Pivot pin 56 supports a yoke 58 composed of two substantially identical arms 60 and 62 spanning the free ends of which is a cross pin 64. As seen most clearly in FIG. 2 cross pin 64 is parallel to the axis of pivot pin 56 and pivot shaft 53 and is perpendicular to the axis of rod 34. A spring 66 has loops for circumscribing protruding ends of pivot pin 56 and cross pin 64 so as to bias the cross pin against shaft 34, i.e. in a counterclockwise direction as viewed in FIGS. 1 and 2.

Piston rod 34 is formed with a plurality of uniformly spaced apart notches 68 extending along the length thereof and diametrically opposite to keyway 52. As seen most clearly in FIG. 6, each notch 68 is of cylindric shape so as to complement the shape of cross pin 64. The notches have a depth approximately equal to the radius of cross pin 64 so that the cross pin can engage one of the notches but not be captured therein. The upper boundary of each notch is formed with a diverging surface 69 so that upon upward movement of cross pin 64 no corresponding upward movement of rod 34 occurs. Notches 68 are spaced uniformly along the length of rod 34, the distance between adjacent notches being equivalent to the width of a french fry piece, typically about ¼ inch.

Rigid with pivot shaft 53 and extending therefrom in a direction generally opposite from crank 54 is a lever arm 70 to the outer end of which is secured one end of a tension spring 72, the opposite end of which is fixed to plate 42 so as to bias pivot shaft 53 into the position shown in FIG. 1. For pivoting shaft 53 in a clockwise direction as viewed in FIG. 1 and against the force of spring 72, there is a handle 74, the inner end of which is rigidly attached to pivot shaft 53 and the outer end of which is accessible to an operator of the machine.

Triangular crank element 54a carries a pin 76 which is radially spaced from shaft 53 and extends outward of the crank. A transverse cutter drive arm 78 is slotted at 80 and engages pin 76, the pin having an enlarged head to retain the drive arm in continuous engagement with the pin. The length of slot 80 will be explained hereinbelow in more detail, it being sufficient for the present to note that the slot and pin 76 form a lost motion linkage between crank 54 and drive arm 78 so that the crank can be pivoted through an arc corresponding to the length of the slot without imparting motion of the drive arm.

The end of the drive arm 78 opposite from slot 80 is pinned at 82 to a crank arm 84 which is rigid with a cutter drive shaft 86. Shaft 86 is supported for rotation on frame 12 by means of an upper bushing 88 supported on plate 42 and a lower bushing 90 supported on horizontal plate 16. Shaft 86 protrudes below horizontal plate 16 at which location there is fixed to the shaft a cutter support member 92. At the outer end of cutter support member 92 and rigid therewith are two upstanding fingers 94 and 96, which as seen in FIG. 1 reside on opposite sides of chamber 26. Scanning the space between fingers 94 and 96 is a taut transverse cutter wire 98 which is substantially coextensive with the plane in which elongate members 22 reside so that when transverse cutter wire 98 is moved across the lower surface of the elongate members, dough protruding through the spaces between the elongate members and therebelow is separated from the dough mass above the elongate members within chamber 26.

In operation rim 20 to which elongate members 22 are attached is placed in opening 18 in horizontal plate 16 and chamber defining wall 24 is installed into the rim. Previously formed potato dough is then introduced into the chamber through opening 30 after which rod 34 is installed from the top so that the lower end of the rod, i.e. the portion defining groove 36 is positioned between the lower surface of horizontal plate 42 and the upper edge of chamber wall 24. At such position piston 32 is installed onto the end of the rod and the rod is moved manually downward until the lower surface of piston 32 contacts the upper surface of the dough within chamber 26. Such downward movement can be effected because of the presence of diverging surfaces 69 in notches 68 and the yieldability of yoke 58 and cross pin 64 due to the presence of spring 66. With the elements of the mechanism in the position described above and shown in FIG. 1 the apparatus is ready to form and dispense french fry shaped potato dough bodies.

When it is desired to form and dispense french fry shaped dough bodies, the exterior end of lever 74 (not shown) is moved downward thereby driving crank 54 in a clockwise direction, as viewed in FIG. 1, against the force of spring 72. Through engagement between cross pin 64 and a notch 68 on rod 34, the rod is moved downward. As the downward movement continues yoke 58 approaches a dead center position, a position at which cross pin 64, pivot pin 56 and pivot shaft 53 all lie in a common plane. During movement prior to arrival at the dead center position, cross pin 64 is retained in engagement with a notch 68 because of the action of spring 66. When link 58 reaches the dead center position, further clockwise rotation of crank 54 effects disengagement of cross pin 64 from notch 68 in rod 34 whereupon downward movement of piston 32 terminates. The length of slot 80 is chosen so that arm 78 is not activated until downward movement of piston rod 32 terminates.

When pin 76 reaches the rearward, i.e. leftward as viewed in FIG. 1, extremity of slot 80, further clockwise rotation of crank 54 drives arm 78 leftward as viewed in the FIGURE whereupon shaft 86 is rotated through the action of lever arm 84. This causes member 92 to drive transverse cutter wire 98 across the lower surface of elongate members 22 thereby severing from the dough mass within chamber 26 the protruding portions of dough. The french fry shaped bodies thus formed fall by gravity into a container positioned on base plate 14. Lever 74 is then raised, either forcefully or by releasing the same so that the force stored in spring 72 can raise it. Upward movement of the lever causes counter-clockwise movement of crank 54 to the position shown in FIG. 1. During such movement pin 76 engages the right-hand extremity of slot 80 to restore member 92 and the transverse wire to its initial position, and then cross pin 64 ratchets upward on diverging notch surface 69 to the next succeeding notch 68 in rod 34. Because spring 66 is configured so as not to raise yoke 58 above the dead center position, such ratcheting action is not impeded. When the apparatus is restored to the position as shown in FIG. 1, it is ready for another cycle of operation by moving lever 74 downward as described.

When it is desired to raise rod 34 and piston 32 for refilling or cleaning chamber 24, pin 64 is retracted from the surface of rod 34 by temporarily holding lever 74 in its lowermost position or by manually pivoting yoke 58 against the force of spring 66. Such retraction frees the rods so that it can be manually raised by grasping the upper end thereof.

Because of the substantial similarity between elements of the motorized version shown in FIGS. 3–5 and the manually operated embodiment of FIGS. 1 and 2, the corresponding elements in the embodiment of FIGS. 3–5 will be identified by reference numerals that are greater by 100 than equivalent parts in the manually operated embodiment. Referring to FIG. 3, there is a main support frame 112 which has a base plate 114 above which is spaced a horizontal support plate 116. The horizontal support plate defines an opening 118 in which a flanged rim 120 is supported, the flanged rim having a plurality of uniformly spaced apart elongate members 122 thereacross. Supported within the rim is a chamber wall 124 which defines a dough chamber 126. In the embodiment of FIGS. 3 and 4 chamber 126 has a rectangular cross-sectional shape. The dough chamber has a discharge opening 128 at the lower end thereof and an upper opening 130 at the opposite end. Slidable within chamber 126 is a piston or plunger 132 which is supported at the lower end of a rod 134, the rod extends coaxially of the chamber and protrudes above an exterior of chamber opening 130. There is a joint at 136 for removably fixing piston 132 at the lower end of rod 134.

Frame 112 includes horizontal plates 142 and 144 which respectively support bushings 146 and 148 to guide rod 134 and piston 132 for movement axially of chamber 126. Rod 134 has a rectangular cross section (see FIG. 4) and bushings 146 and 148 have corresponding shapes so that rotation of rod 134 is prevented.

Supported in spaced relation to rod 134 and perpendicular to the longitudinal axis thereof is a pivot shape 153. Rigid with pivot shaft 153 is a crank 154 which projects toward rod 134 by an amount less than the distance between the pivot shaft and the rod. The distal end of crank 154 carries a pivot pin 156 on which is supported for pivotal movement relative to the crank a yoke 158 composed of two parallely spaced apart arms 160 and 162. At the free end of yoke 158 is a cross pin 164. The sum of the length between cross pin 164 and pivot pin 156 and the length between pivot pin 156 and pivot shaft 153 are greater than the distance between the axis of pivot shaft 153 and rod 134 so that the dead center position occurs when crank 156 slopes downward at about 45°14′50″. There is a spring 166 which biases yoke 158 toward rod 134, i.e. in a counter clockwise direction as viewed in FIG. 3. The surface of rod 134 contacted by cross pin 164 defines a plurality of notches which are identical in shape, spacing and function to notches 68 described hereinabove in conjunction with the embodiment of FIGS. 1–2 and 6.

Extending radially outward of pivot shaft 153 and rigid therewith is a lever arm 170 to the outer end of which is pivotally attached a drive rod 174. The pivot connection between lever arm 170 and drive arm 177 includes a spherical joint 173 so that an operative connection between the lever arm and the drive rod is maintained notwithstanding angular excursion between the two parts.

The end of arm 174 opposite from the end attached to lever 170 is secured at 175 for rotative movement on a pin 177 that is fixed to an eccentric rod 174. Eccentric arm 179 is fixed to a motor shaft 181 of a motor 183. Because of the eccentricity between pin 177 and motor shaft 181, rotation of the motor rocks crank 154 so as to advance piston 132 downward one increment for each rotation of the motor shaft through coaction of yoke 158, cross pin 164 and notches 168. Also connected to pin 177 for actuation in response to rotation of motor shaft 181 is a transverse cutter drive arm 178. The end of drive arm 178 opposite from pin 177 is pivotally connected at 182 to a crank arm 184. Crank arm 184 is fixed to the upper end of a cutter drive shaft 186 which is journaled for rotation in an upper bushing 188 and a lower bushing 190. At the end of cutter drive shaft 186 that protrudes below horizontal plate 116 there is a cutter support member 192 which supports spaced apart upstanding fingers 194 and 196; a taut transverse cutter wire 198 extends between the fingers in a plane coincident with the lower exterior surface of elongate members 122.

For controlling the operation of motor 183, a microswitch 200 is secured to plate 142 so that its actuator 200a is in the path of rotation of eccentric arm 179. As seen in FIG. 4, microswitch 200 is located so that actuator 200a is located at about a 7 o'clock position with respect to the axis of shaft 181, a position at which crank arm 184 is at its rearwardmost extreme position, shown in broken lines in the FIGURE. Referring to FIG. 5, microswitch 200 has a set of normally closed contacts 200c so that when eccentric 179 resides in the 7 o'clock position, contacts 200c are open. In parallel with contacts 200c are normally open contacts 202c of a push button switch 202 which is accessible to the operator from the front of the machine. The parallel combination of contacts 200c and 202c is in series between a line terminal L, and a controlled conductor 204. There is a second line terminal $L_2$; AC power is connected across terminals $L_1$ and $L_2$. Conductor 204 is connected to a motor control relay 206 which switches power to motor 183.

For effecting rapid termination of rotation of motor 181, which occurs when contacts 200c are opened, there is a solenoid operated brake 208 which includes a brake shoe 210 which is biased into engagement with shaft 181 by a spring 212. A solenoid coil 214 releases shoe 210 from engagement with shaft 181 and against the force of spring 212 when the solenoid coil is energized. The solenoid coil has one terminal connected to line controlled conductor 204 and the other terminal connected to line terminal $L_2$ so that the brake is disengaged when there is power on conductor 204 in response to closure of contacts 200c and/or 202c.

In operation the motorized embodiment of FIGS. 3–5 can be understood by realizing that eccentric 179 is normally in the 7 o'clock position so that the outer end of the eccentric actuates microswitch actuator 200a so as to open contact 200c. In this condition no power is supplied to motor relay 206 or to solenoid 214. Accordingly, spring 212 urges brake shoe 210 into engagement with shaft 181 and the motor is not energized wherefore it remains stationary or quiescent. When it is desired to dispense a quantity of french fry shaped pieces, push button 202 is depressed thereby closing contacts 202c. Closure of contacts 202c connects power to conductor 204 which energizes brake solenoid 214 to release brake shoe 210 from engagement with shaft 181 and actuates motor relay 206 to energize motor 183. Energization of the motor effects counterclockwise rotation, as viewed in FIG. 4, of eccentric arm 179. As soon as eccentric arm 179 revolves out of contact with microswitch actuator 200a, contacts 200c close so that operation continues without the necessity for retaining push button 202 in an operated position. During rotation of eccentric arm 179 from a 7 o'clock position to about a 3 o'clock position, crank 154 is rocked in a counterclockwise direction so as to move cross pin 164 upward and into engagement with the next succeeding notch 168 on rod 134. Concurrent with such action, shaft 186 is rotated through the coaction of arm 178 and crank 184 to the solid line position shown in FIG. 4. In consequence of such movement of shaft 184, arm 192 and transverse cutter wire 198 are moved to a position laterally of discharge opening 128, such position being indicated at 198b in FIG. 4. Further rotation of eccentric arm 179 to about a 12 o'clock position rocks crank 174 in a clockwise direction and thereby advances plunger 132 downward to transport dough through the spaces between parallel elongate members 122. During such movement, i.e. from about the 3 o'clock position to about the 12 o'clock position, shaft 186 experiences little if any rotative movement, the configuration and location of the parts affording to motion mechanism which advances the dough in chamber 126 without activating the transverse cutter. As the eccentric 179 moves from the 12 o'clock position to the 7 o'clock position, shaft 186 is rotated in a clockwise direction whereupon transverse cutting wire 198 is moved across the protruding dough back to the position identified at 198a. As the transverse wire so moves, it separates the protruding dough thereby forming french fry bodies which drop into a container supported on base plate 114. When eccentric arm again reaches the 7 o'clock position, it contracts microswitch actuator 200a which opens contacts 200c to de-energize motor 183 and permit spring 212 to apply brake shoe 210 to motor shaft 181. The machine has thus completed one cycle of operation and is ready for further operation upon depression of push button switch 202.

Both the manually operated embodiment and the motor operated embodiment afford accurate formation of french fry shaped bodies with extremely straightforward and trouble free mechanism. The provision in each embodiment of a pivotally movable link that has a length less than the distance between its pivot axis and the piston drive rod together with a pivoting yoke on which the cross pin for engaging the rod notches is supported achieves uniform advancement of the rod for each cycle of operation. The fact that each embodiment of the invention employs such mechanism which terminates downward movement of the rod when the crank and yoke pass the dead center position assures uniform dough advancement for each cycle of operation. Moreover, the lost motion connection between the transverse wire cutter and the piston drive mechanism assures formation of french fry shaped potato pieces of substantially square cross section. Finally, the minimal number of parts, even in the motorized embodiment of the invention, affords a structure that is both low in initial cost and reliable and maintenance-free during operation.

Although two embodiments have been shown and described, it will be obvious that other adaptations and modifications can be made without departing from the true spirit and scope of the invention.

We claim:

1. In apparatus for forming french fry shaped bodies from potato dough of the type in which dough is moved through the spaces between a plurality of parallelly spaced elongate members so as to form protruding dough pieces that protrude by a distance corresponding to the width of a french fry shaped piece and wherein a cutter wire is reciprocated across the protruding dough to sever the protruding dough pieces from the dough on the opposite side of the elongate members, the improvement comprising a piston for moving the dough toward said elongate members, an elongate rod secured to said piston, a plurality of uniformly spaced apart slots in said rod, each said slot having a concave cylindric surface extending transversely and chordally of said rod, the interval between adjacent slots being approximately equal to the width of a french fry shaped potato piece, a crank arm and means for supporting said crank arm for pivotal movement above a fixed pivot axis perpendicular to and spaced from said rod, said crank arm having a distal end spaced from said rod by an increment so that said distal end is intermediate said pivot axis and said rod, a yoke having a first end pivotally supported at said distal end and a free end spaced from the distal end by a distance greater than the increment, a cross pin mounted at said free end and extending in parallelism to said pivot axis and engagable with said notches, said cross pin being of cylindric shape and having a radius substantially equal to that of said notch surface so as to contact said notch surface over a substantial surface area, means for biasing said yoke relative said crank arm to effect engagement of said cross pin with the notches in said shaft, means for rocking said crank arm in an arc less than 360° to produce a power stroke so that said cross pin moves said rod and said piston toward the spaced apart elongate members, said distal end describing an arcuate path during said power stroke so that said crank arm and said yoke pass through a dead center position during said power stroke, said cross pin, said distal end and said pivot axis residing in coplanar relation at said dead center position so that further pivotal movement of said crank does not effect further movement of said rod and said piston, and means linked to said rocker arm for reciprocating said cutter wire, said reciprocating means acting to reciprocate said wire cutter only after said dead center position.

2. Apparatus according to claim 1 wherein said rocking means includes a lever having a first end operatively connected to crank arm and a second end remote from first end, said second end being accessible for manual operation of said lever.

3. Apparatus according to claim 1 wherein said rocking means includes a motor having a shaft, an eccentric arm secured to said shaft, and means for operatively connecting said crank arm to said eccentric arm so that said crank arm moves in a return stroke and a power stroke in response to rotation of said motor shaft, and wherein said cutter wire reciprocating means includes a link operatively connected to said eccentric arm so that said cutter wire is reciprocated in response to rotation of said eccentric arm.

4. Apparatus according to claim 3 including means for controlling said motor comprising a microswitch having an actuator and a normally closed contact, means for mounting said microswitch in spaced relation to said motor shaft so that said actuator is actuated by said eccentric arm in a given rotational position of said eccentric arm, said normally closed contact being opened at said given rotational position, a power circuit for supplying power to said motor, said contacts being series connected in said power circuit so that power to the motor is interrupted at said given rotational position, and a push button switch having normally opened contacts connected in shunt with said microswitch contacts so that said motor can be momentarily activated by said push button switch to rotate the eccentric arm away from said given position.

5. Apparatus according to claim 1 wherein said cutter wire reciprocating means includes a cutter drive shaft journalled for rotation in parallel spaced relation to said rod and having a first end adjacent said crank arm, a lever arm fixed to said first end, said lever arm having an outer end radially spaced from said cutter drive shaft, a rigid driving arm having a first extremity pivotally attached to said outer end and a second extremity remote from said first extremity, and lost motion linkage means for linking said second extremity to said crank arm so that said wire is remote from said elongate members during movement of said rod toward said elongate members.

6. Apparatus according to claim 5 wherein said lost motion linkage means includes a portion of said driving arm adjacent said second extremity defining a slot that is elongate in a direction longitudinally of said driving arm, a pin slidably engaged in said slot and fixed for rotation with said crank arm so that said pin tradverses an arcuate path during movement of said rod toward said elongate members, said slot having a length corresponding to that of said arcuate path so that force is applied to said driving arm only after termination of movement of said rod toward said elongate members.

7. Apparatus according to claim 5 wherein said lost motion linkage includes a power shaft, means for rotatively driving said power shaft, an eccentric arm secured to said power shaft and having a free end that describes a circular path in response to rotation of said power shaft, the second extremity of said driving arm being pivotally attached to said free end of said eccentric arm, and rigid crank drive arm connected between said free end and said crank arm so as to rock said crank arm in response to rotation of said power shaft, said crank drive arm being generally perpendicular to said eccentric arm during a stroke that moves said rod toward said elongate members, said cutter driving arm residing at a small acute angle to said eccentric arm during said stroke so as to impart minimal motion to said cutter driving arm during said stroke.

8. Apparatus according to claim 1 wherein said cross pin has a cylindrical cross-sectional shape and wherein said notches have an approximately hemi cylindrical shape of a diameter substantially equal to that of said cross pin, each said notch at a region remote from said piston having a diverging surface portion that diverges outward of said notch and away from said piston so that during rocking movement of said crank in a direction away from said piston said cross pin disengages said notches.

* * * * *